United States Patent [19]

Ueda et al.

[11] Patent Number: 4,811,490

[45] Date of Patent: Mar. 14, 1989

[54] METHOD AND DEVICE FOR MEASURING CLEARANCES BETWEEN GEARS

[75] Inventors: Hiroshi Ueda; Mamoru Sugimoto, both of Itami, Japan

[73] Assignee: Sumitomo Electric Industries, Ltd., Osaka, Japan

[21] Appl. No.: 161,071

[22] Filed: Feb. 19, 1988

[30] Foreign Application Priority Data

Feb. 27, 1987 [JP] Japan .................................. 62-46294

[51] Int. Cl.⁴ ............................. G01B 3/22; G01B 7/14
[52] U.S. Cl. .................................. 33/179.5 R; 73/162; 33/573; 33/549; 33/555
[58] Field of Search .................. 73/162; 33/179.5 R, 33/179.5 E, 567, 569, 573, 542, 549, 555, 543, 168 R, 610, 655

[56] References Cited

U.S. PATENT DOCUMENTS

| | | | |
|---|---|---|---|
| 2,060,803 | 11/1936 | Falk | 73/162 |
| 2,318,709 | 5/1943 | Persson | 33/549 |
| 2,877,648 | 3/1959 | Bieger et al. | 73/162 |
| 2,929,147 | 3/1960 | Hall | 33/555 |
| 2,961,873 | 11/1960 | Carlsen | 73/162 |
| 3,583,072 | 6/1971 | Muller | 73/162 |
| 3,851,398 | 12/1974 | Hilburger | 73/162 |
| 4,261,198 | 4/1981 | Moore | 73/162 |

Primary Examiner—William A. Cuchlinski, Jr.
Assistant Examiner—Thomas B. Will
Attorney, Agent, or Firm—Wenderoth, Lind & Ponack

[57] ABSTRACT

A method and device for measuring clearance between gears of an internal gear having an inner gear and an outer gear. With the inner gear fixed, the outer gear is set around the inner gear and brought into abutment with the inner gear at one side. The outer gear is then moved in the opposite direction to butt the inner gear at the outer side. The clearance between the two gears is determined by measuring the distance for which the outer gear moves. This method is much simpler and time-saving than a conventional method using clearance gauges.

4 Claims, 2 Drawing Sheets

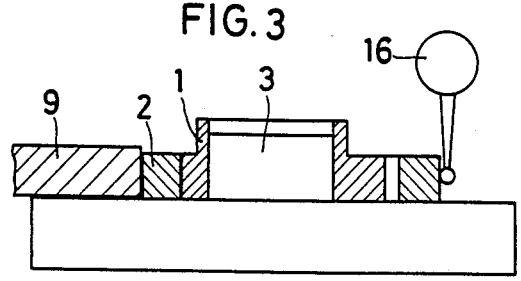
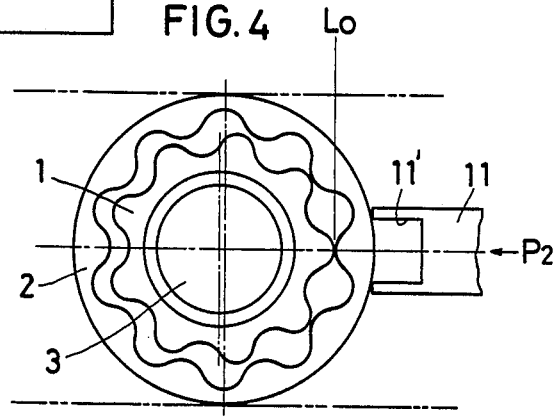
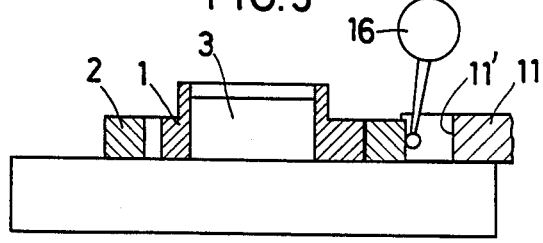
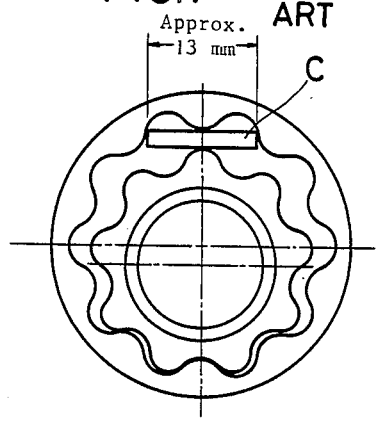
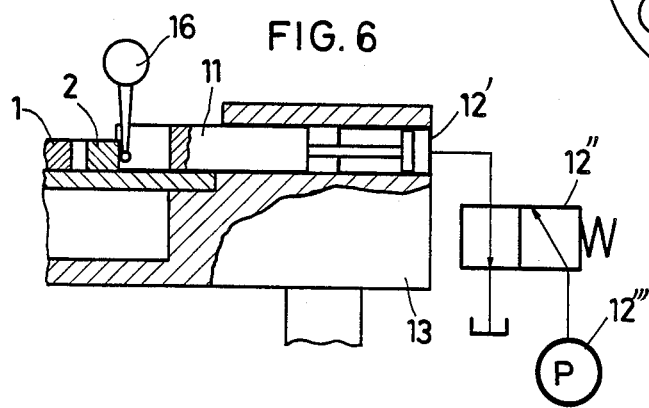

METHOD AND DEVICE FOR MEASURING CLEARANCES BETWEEN GEARS

The present invention relates to a method and device for measuring clearances between gears in a gear assembly of an internal gear type such as a gear pump.

With the advancement of industrial machines, internal gears comprising an inner gear and an outer gear are in an increasing use for various applications such as for machine tools, automobiles or aircrafts. The requirement for a precise finish of an inner gear and an outer gear increases as the gear assembly is driven at a higher speed with a higher power. In order to meet such a requirement, the intergear clearances of a gear assembly having a section as shown in FIG. 7 have heretofore been measured by use of a clearance gauge c as illustrated. A standard clearance gauge for this purpose measures about 13 mm wide and its thickness is available in multiples of 0.01 mm.

Such a conventional clearance measuring method entails several problems as set forth hereinafter:

(1) Since a clearance gauge has a thickness which is a multiple of 0.01 mm, no measurements smaller than 0.01 mm are measurable.

(2) The pressure exerted on a clearance gauge when it is inserted differs with a measuring person. This tends to increase measuring errors.

(3) Since a standard gauge is about 13 mm wide, it cannot be used to measure a clearance less than 13 mm wide.

(4) It requires much time to select an optimum clearance gauge according to the width and thickness of the clearance to be measured.

(5) The number of clearance measuring points per gear assembly is the number of teeth of an inner gear multiplied by that of an outer gear. Thus, it will take an extremely long time to take measurements at all the measuring points by use of clearance gauges.

It is an object of the present invention to provide a method and device for measuring a clearance between the gears which eliminates the need for clearance gauges and which is simple and accurate and which obviates the abovesaid shortcomings.

In accordance with the present invention, there is provided a method for measuring clearances between gears in an internal gear assembly having an inner gear and an outer gear, the method comprising the steps of supporting the inner gear in position so as to be rotatable around its axis, setting the outer gear around the inner gear so as to be rotatable about its axis and movable in the direction of a centerline connecting the axis of the outer gear to the axis of the inner gear, positioning the center of a tooth space of either the inner gear or the outer gear and the center of a tooth of the other on the centerline, and moving the outer gear alternately in opposite directions along the centerline so as to abut the inner gear at either side, and measuring the distance by which the outer gear has moved with respect to the inner gear to measure the clearance between the inner gear and the outer gear.

From another aspect, the present invention consists in a device for measuring clearances between gears in an internal gear assembly having an inner gear and an outer gear, the device comprising a horizontal table for supporting the internal gear assembly, a fastening means inserted in a bore formed in the inner gear to rotatably hold the inner gear in a stationary position, a rotary shaft coupled to the fastening means to rotate the inner gear about its axis, a pair of biasing means for pushing the outer gear alternately in opposite directions along a horizontal centerline connecting the axis of the inner gear to the axis of the outer gear, and means for measuring the positions of the outer gear to measure the distance for which the outer gear or the biassing means has moved to measure the clearance between the inner gear and the outer gear.

The outer gear and the inner gear are put together and placed on the horizontal table. The inner gear is mounted on the horizontal table by a fastening means so as to be rotatable about its axis but not to be horizontally movable. A rotary shaft coupled to the fastening means may be rotated by a handle or any other suitable driving means.

The inner gear and the outer gear are positioned so that either the center of a tooth space of the former and the center of a tooth of the latter or the center of a tooth of the former and the center of a tooth space of the latter will be placed on the above-described centerline. After having set the inner and outer gears in position by turning them, one of the pair of biasing means is pressed against the outer gear to move it in one direction until it abuts the inner gear to reduce the clearance at the pressure receiving side to zero. The pressures on the outer gear should be kept constant in order to minimize errors in measurement. At a side opposite to the pressure receiving side along the centerline, there exists a clearance to be measured. The position of outer edge of the outer gear opposite to the pressure receiving side is measured by use of a measuring means such as a dial gauge. The other biasing means is then pressed against the outer gear to shift it in the opposite direction until the clearance formed at the side of the measurement point becomes zero. The position of the measurement point is taken again by the dial gauge. The difference between the two positions is measured. Thus, according to the present invention, the clearance formed in an internal gear can be accurately measured without using any clearance gauges.

According to the present invention, a clearance can be measured readily and accurately merely by calculating the distance of the movement of the outer gear instead of repeatedly slipping a clearance gauge into and out of the clearance as with the conventional method.

With the hand-operated or automated clearance measuring device of the present invention, measuring errors are limited to a minimum because the pressures applied to the outer gear from opposite directions are maintained constant.

Other features and objects of the present invention will become apparent from the following description taken with reference to the accompanying drawings, in which:

FIGS. 2 to 5 are enlarged views of a portion of the same showing bow it is used;

FIG. 6 is a schematic view showing another example of the biassing means; and

FIG. 7 is an explanatory view illustrating a conventional method for measuring clearances.

Figure 1:
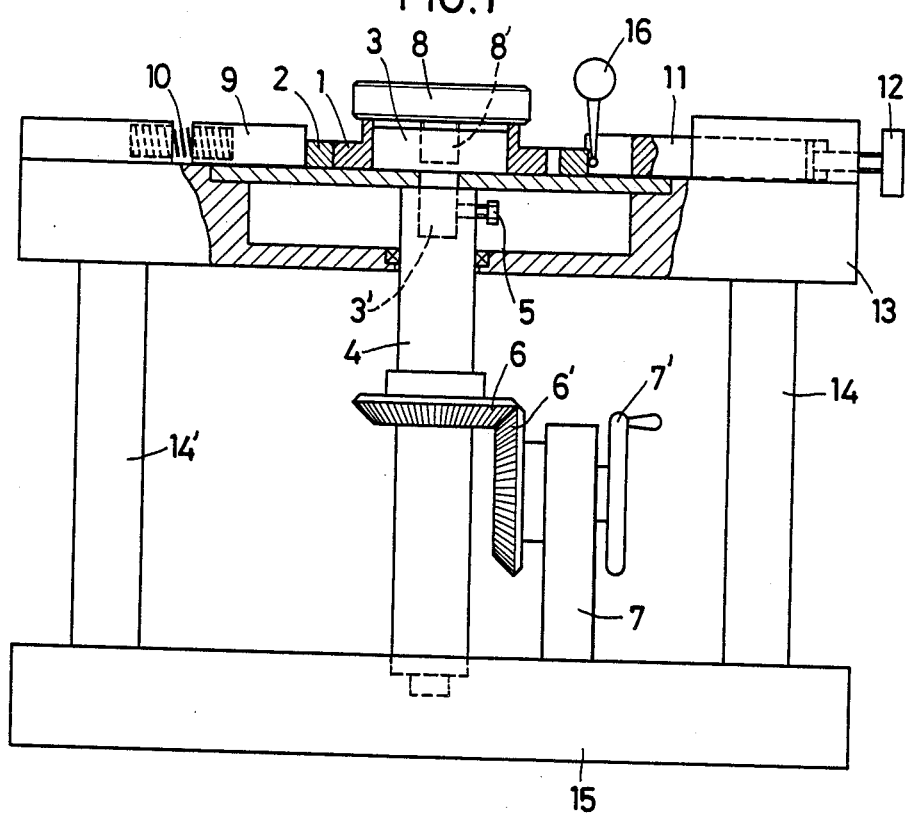
FIG. 1 is a sectional view of a portion of the manually operated clearance measuring device embodying the present invention.

Referring more particularly to FIG. 1, an inner gear and an outer gear are represented by numerals 1 and 2, respectively. The outer gear has one more teeth than the inner gear. In order to rotatably mount the inner gear 1 in a predetermined horizontal position, a fastening means such as a bolt 3 having substantially the same diameter as the inner diameter of the inner gear 1 has its shank 3' set in an upright rotary shaft 4 and fastened thereto by means of a setscrew 5. The rotary shaft 4 is rotated by a handle 7' on a stand 7 through bevel gears 6 and 6'. Another bolt 8 is provided over the inner gear 1 and fixed in position by getting its shank 8' into threaded engagement with the bolt 3 to check the up- and-down movement of the inner gear 1.

On the lefthand side of the drawings, there is provided a biasing member which comprises a contact portion 9 and a spring 10 and serves to urge the outer gear 2 to the righthand side. The pressure to be exerted on the outer gear 2 can be varied by adjusting the spring 10. On the righthand side of the drawings is provided another biasing member comprising a contact portion 11 and a knob 12. The contact portion 11 is adapted to be moved back and forth by turning the knob 12.

The knob may be replaced with a biassing means comprising a hydraulic or pneumatic cylinder 12', a selector valve 12" and a pump 12"' as shown in FIG. 6.

The inner gear 1, outer gear 2, bolt 3, and contact portions 9 and 11 are placed on a horizontal table 13 having its legs 14 and 14' supported on a base 15. A dial gauge 16 is supported on the horizontal table 13 or from any other suitable position by an arm to measure the movement of the outer gear 2.

Next, we shall explain by way of example how the clearance measuring device is used with reference to FIGS. 2 to 5.

Figure 2:
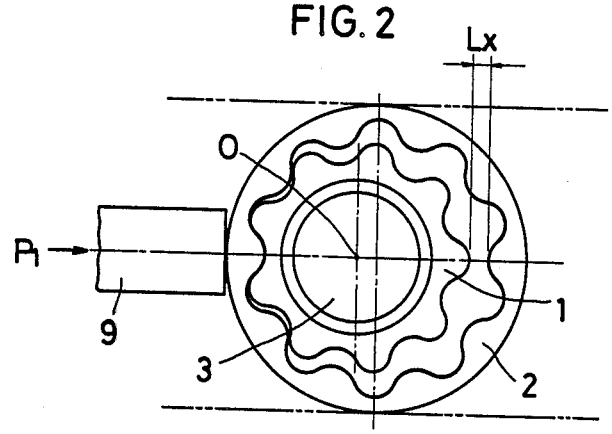

The inner gear 1 is placed on the horizontal table 13 right over the upright rotary shaft 4. The bolt 3 is inserted into the bore of the inner gear 1 to get the inner gear into alignment with the rotary shaft 4. The inner gear 1 is rotatably mounted with respect to the rotary shaft 4. The outer gear 2 is then set around the inner gear 1. If the inner gear has teeth of an odd number, the handle 7 is rotated to bring the center of a tooth space of the inner gear 1 onto a centerline connecting the axis of the contact portion 9 to the axis O of the inner gear 1, as shown in FIG. 2. If the inner gear has teeth of an even number, the center of tooth of the inner gear may be set on the centerline. The outer gear 2 is set in position around the inner gear 1 while pushing back by hand the contact portion 9 against the bias of the spring 10.

The contact portion 9 is then freed from the hold by hand so as to push the outer gear 2 against the inner gear 1 with a force P1. If at this stage the outer gear 2 and the inner gear 1 are not in proper meshing engagement between the tooth top and the tooth space as shown in FIG. 2, the outer gear 2 is manually joggled to set the center of its tooth or tooth space precisely on the centerline. Now, the clearance is nil between the outer and inner gears at the lefthand side of FIG. 2. Thus, the clearance defined therebetween at the righthand side is the clearance Lx to be measured. In this state, the dial gauge 16 is brought into abutment against the right end of outer gear 2 to read its position with respect to the reference point as shown in FIG. 3. A guide should preferably be provided to enable the outer gear 2 to move only in parallel with the center line as shown in FIGS. 2 and 4 by dotted lines.

After measurement, the knob 12 is turned to advance its threaded shank while relaxing the bias of the spring 10 by hand so as to push the contact portion 11 with a force P2 larger than P1 to move the outer gear 2 to the lefthand side until it abuts the inner gear 1 as shown in FIG. 4. The dial gauge 16 is again brought into abutment against the right end of the outer gear 2 as shown in FIG. 5 to read its position. The outer gear 2 is thus alternately pushed by two forces opposite in direction to each other and parallel to the center line crossing the axis O. The clearance to be measured is taken by calculating the distance by which the outer gear 2 has moved.

The dial gauge 16 may be set against the contact portion 9 or 11 instead of the outer gear 2 to measure the movement of the contact portion.

In the preferred embodiment illustrated, the inner gear 1 has nine teeth and the outer gear 2 has ten teeth. This means that there are 90 points to be measured per set. To take measurements at the 90 points, the inner gear 1 is turned at angular intervals equal to its tooth pitch with respect to the outer gear 2 kept stationary to get every one of its nine teeth into meshing engagement with each tooth of the outer gear 2 and measure the clearance thus formed between the inner gear 1 and the outer gear 2. Every time the inner gear 1 makes one full turn in the manner described, the outer gear 2 is turned one tooth pitch ahead and the measurements are repeated until it makes a full turn.

The manual-operated clearance measuring device described above may have its parts replaced with the following parts in order to automate its operation. Namely, the contact portion 9, spring 10, contact portion 11 and knob 12 may be replaced with hydraulic or pneumatic press cylinders (including contact portion), and the handle 7' with a pulse motor, so that the movements of the outer gear will be calculated automatically by converting the measurements obtained by the dial gauge 16 into electric signals and inputting the signals into a computer. To achieve an automatic operation of the entire mechanism in a coordinated manner, a control circuit is provided which acts as a sequence circuit which sends instructions to either of the press cylinders at both sides to push the outer gear right or left, to the dial gauge to measure the movement of the outer gear, and to the inner gear to turn on its axis by an angle equal to its tooth space pitch or tooth pitch for every measurement, so that each of the steps will be carried out in this order.

Though in the preferred embodiment, the inner gear is rotatably held in a stationary position, whereas the outer gear is slidable in the direction of the centerline, it is possible to fix the outer gear in a stationary position and allow the inner gear to be moved along the centerline. In that case, the inner gear is mounted on a fastening means which is rotatable and slidable only in the direction of the centerline. The movement of the inner gear with respect to the outer gear is calculated by measuring the movement of the fastening means.

The manually operated clearance measuring device according to the present invention can eliminate one major problem encountered by the conventional method for clearance measurement that errors in measurement are so great among measurers that it is impossible to determine which is correct (in a laboratory experiment, an average measuring error among five measurers was 0.04 mm). According to the present invention, an average measuring error was no more than 0.01 mm with the manual measuring device and no more than 0.005 mm with the automated clearance measuring device. Such small error values are mainly attributable to stable and constant two-way pressures that act on the outer gear.

In a conventional method for clearance measurement, it took about 90 minutes to measure the clearances at 90 points between an inner gear with nine teeth and an outer gear with ten teeth. In contrast, with the manual-operated clearance measuring device of the present invention, it took only nine minutes for the same measurements, and with the automated clearance measuring device it took only two minutes.

What is claimed is:

1. A method for measuring clearances between gears in an internal gear assembly having an inner gear and an outer gear, said method comprising the steps of supporting said inner gear in position so as to be rotatable around its axis, setting said outer gear around said inner gear so as to be rotatable about its axis and movable in the direction of a centerline connecting the axis of said outer gear to the axis of said inner gear, positioning the center of a tooth space of either said inner gear or said outer gear and the center of a tooth of the other on said centerline, and moving said outer gear alternately in opposite directions along said centerline so as to abut said inner gear at either side, and measuring the distance by which said outer gear has moved with respect to the inner gear to measure the clearance between said inner gear and said outer gear.

2. A device for measuring clearances between gears in an internal gear assembly having an inner gear and an outer gear, said device comprising a horizontal table for supporting said internal gear assembly, a fastening means inserted in a bore formed in said inner gear to rotatably hold said inner gear in a stationary position, a rotary shaft coupled to said fastening means to rotate said inner gear about its axis, a pair of biasing means for pushing said outer gear alternately in opposite directions along a horizontal centerline connecting the axis of said inner gear to the axis of said outer gear, and means for measuring the positions of said outer gear to measure the distance for which said outer gear or said biassing means has moved to measure the clearance between said inner gear and said outer gear.

3. A device for measuring clearances between gears in an internal gear assembly as claimed in claim 2, wherein one of said pair of biasing means comprises a contact portion and a spring, and the other comprises a contact portion and a knob.

4. A device for measuring clearances between gears in an internal gear assembly as claimed in claim 2, wherein one of said pair of biasing means comprises a contact portion and a spring, and the other comprises a contact portion, a cylinder, a selector valve and a pump.

* * * * *